United States Patent [19]

Kishimoto

[11] Patent Number: 4,965,303

[45] Date of Patent: Oct. 23, 1990

[54] POLYCARBONATE COMPOSITION

[75] Inventor: Kazuo Kishimoto, Matsuyama, Japan

[73] Assignee: Teijin Chemicals, Ltd., Tokyo, Japan

[21] Appl. No.: 389,304

[22] Filed: Aug. 3, 1989

[30] Foreign Application Priority Data

Aug. 4, 1988 [JP] Japan ................................. 193488
Oct. 12, 1988 [JP] Japan ................................. 254873

[51] Int. Cl.$^5$ ........................... C08K 5/15; C08K 5/07
[52] U.S. Cl. ................................ 524/107; 524/108; 524/317; 524/355; 524/369; 522/75; 522/79
[58] Field of Search ............... 522/75, 79; 524/107, 524/108, 317, 355, 369

[56] References Cited

U.S. PATENT DOCUMENTS

| | | | |
|---|---|---|---|
| 4,624,972 | 11/1986 | Nace | 524/292 |
| 4,880,850 | 11/1989 | Nelson et al. | 524/379 |
| 4,880,853 | 11/1989 | Nelson et al. | 524/357 |
| 4,880,855 | 11/1989 | Nelson et al. | 524/167 |
| 4,880,856 | 11/1989 | Avakian | 524/83 |
| 4,882,366 | 11/1989 | Nelson et al. | 524/226 |

Primary Examiner—Kriellion Morgan
Attorney, Agent, or Firm—Sherman and Shalloway

[57] ABSTRACT

A polycarbonate composition comprising 100 parts by weight of polycarbonate and 0.1 to 1.0 part by weight of at least one anti-yellowing compound selected from the group consisting of itaconic acid, itaconic anhydride, benzaldehyde dimethyl acetal, benzaldehyde propyleneglycol acetal and p-phthalaldehyde.

10 Claims, No Drawings

POLYCARBONATE COMPOSITION

This invention relates to a polycarbonate composition used for medical uses. More specifically, this invention relates to a polycarbonate composition which is less likely to be yellowed when it is subjected to a sterilization treatment with irradiation of gamma rays.

Polycarbonate is a resin having excellent transparency, sanitariness, dimensional stability and impact strength, which is broadly used in industrial fields, and as instruments and equipment for medical treatment as one field of such industrial fields. In general, when a substance is used for medical uses, it is subjected to a sterilization treatment prior to the uses. Heretofore, as such sterilization treatment, a treatment with ethylene oxide and a treatment with aqueous vapor in an autoclave, for example, have been carried out. Recently, however, a treatment with irradiation of gamma rays is generally used because it may be carried out in a dry state, at a low temperature and relatively cheaply.

However, polycarbonate has drawback in that it is yellowed by irradiation of gamma rays, and said drawback is similarly brought about regardless of a medium in which the irradiation is carried out, be it in the air, in vacuo or in the absence of oxygen. This yellowing not only degrades the appearance of instruments and equipment for medical use, but also, when, for example, blood is observed through the yellowed instruments or equipment, the blood looks darkish, resulting in giving an unpleasant feeling to the patient. Due to this, it is necessary to improve such yellowing to an admissible range.

It is known to impart anti-gamma rays property to polyolefin by adding thereto benzhydrol, a hydrocarbon oil, phthalic acid ester, hindered amine and pentaerythritol phosphite. However, it was not possible to decrease yellowing of polycarbonate even if it was added with pentaerythritol phosphite.

As the known means for advancing the anti-gamma rays property of polycarbonate, method of blending polyethylene terephthalate ("Modern Plastics", Jan. 1984), a boron compound (U.S. Pat. No. 4,686,245) and polyetherpolyol or an alkyl ether thereof (European Patent No. 228,525) with polycarbonate, respectively were proposed, however, none of these methods has been commercialized yet.

Accordingly, an object of this invention is to improve the anti-yellowing of polycarbonate caused by gamma rays with which it is irradiated.

As a result of assiduous investigations, the present inventor finds that by adding the specified compound in the specified amount to polycarbonate, this object is achieved.

Thus, according to this invention, there is provided a polycarbonate composition comprising 100 parts by weight of polycarbonate and 0.1 to 1 part by weight of at least one anti-yellowing compound selected from the group consisting of itaconic acid, itaconic anhydride, benzaldehyde dimethyl acetal, benzaldehyde propyleneglycol acetal and p-phthalaldehyde.

Polycarbonate used in this invention is obtained by a reaction of a divalent phenol with a carbonate precursor such as phosgene and diphenyl carbonate.

As such divalent phenol, there may be cited, for example, hydroquinone, dioxydiphenyl, bis(hydroxyphenyl)methane, 1,2-bis(hydroxyphenyl)ethane, 2,2bis(hydroxyphenyl)propane, 2,2-bis(hydroxyphenyl)butane, 2,2-bis(hydroxyphenyl)hexane, 1,1-bis(hydroxyphenyl) cyclohexane, bis(hydroxyphenyl)ether, bis(hydroxyphenyl)ketone, bis(hydroxyphenyl)sulfide, bis(hydroxyphenol)sulfone, alpha, alpha'-bis(hydroxyphenyl)diisopropylbenzene and nucleus substitution products of the lower alkyls thereof. A part of phosgene may be substituted by terephthalic acid chloride and isophthalic acid chloride. Polycarbonate used in this invention may be a homopolymer, a copolymer or a mixture thereof, and may have a branched structure.

Compounds that should be blended with polycarbonate as anti-yellowing agents are itaconic acid, itaconic anhydride, benzaldehyde dimethyl acetal

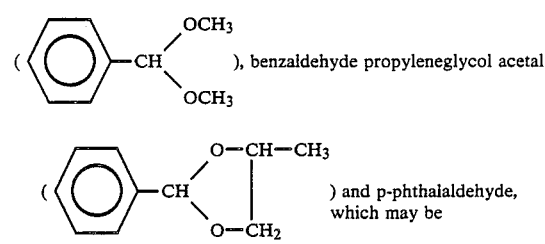

used singly or in combination. Of these compounds, especially benzaldehyde propyleneglycol acetal and itaconic acid are preferable. The blending amount is per 100 parts by weight of polycarbonate, 0.1 to 1.0 part by weight, preferably 0.3 to 0.7 part by weight. If the blending amount is less than 0.1 part by weight, the effect aimed at cannot be obtained, and if the blending amount exceeds 1.0 part by weight, the heat resistance at the time of molding becomes inferior, resulting in the poor appearance of the resulting molded article.

As a method of uniformly mixing the aforesaid compound with polycarbonate, an optional method may be properly adopted. For example, a method of mixing the two in a tumbler or a Henschel's mixer and then pelletizing the resulting mixture by an extruder or a method of quantitatively projecting the two into the hopper of an extruder by a feeder and then pelletizing the resulting mixture may be adopted. The resulting pellets are molded into medical instruments, medical equipment and the parts thereof by ordinary methods such as injection molding, extrusion molding, compression molding and blow molding.

As required, the composition of this invention may be further blended with a mold releasing agent, a stabilizer, an antioxidant and a coloring agent such as a pigment.

Medical instruments, medical equipment and the parts thereof produced from the composition of this invention have a small degree of yellowing ($\Delta YI$) of less than 10 at irradiation of gamma rays of 2.5 megarads (MR) that are sufficient amount of irradiation for sterilization. Accordingly, when blood of a patient is put in, for example, a medical instrument produced from the composition of this invention treated with irradiation of gamma rays, the blood does not look darkish, and does not give an unpleasant feeling to the patient as a result.

Hereinbelow, this invention will be explained by way of examples. All parts appearing in the following examples are by weight.

EXAMPLES 1 TO 5 AND COMPARATIVE EXAMPLE

One hundred parts of polycarbonate ("Panlite L-1225" produced by Teijin Chemicals, Ltd.) was blended with various anti-yellowing agents (yellowing inhibitors) described in Table 1 in amounts described in the same table.

Each of the resulting blends (mixtures) was extruded at 280° C. by an extruder to be pelletized. The resulting pellets were molded at 340° C. by injection molding to obtain a 45×50×2 mm transparent plate. The resulting transparent plate was irradiated with 2.5 megarads (MR) of cobalt 60 gamma rays. The degrees of yellow color Yl of the transparent plate before and after the irradiation were measured according to JIS K7103, and from the measured values of said degrees, the degree of yellowing (ΔYl) was sought.

The results are shown in Table 1.

TABLE 1

| | Anti-yellowing agent (Yellowing inhibitor) | | |
|---|---|---|---|
| | Kind | Amount added | ΔYl |
| Example 1 | Itaconic acid | 0.3 part | 8.3 |
| Example 2 | Itaconic anhydride | 0.5 part | 5.4 |
| Example 3 | Benzaldehyde dimethyl acetal | 0.5 part | 5.8 |
| Example 4 | Benzaldehyde propyleneglycol acetal | 0.5 part | 5.7 |
| Example 5 | p-Phthalaldehyde | 0.5 part | 5.7 |
| Comparative Example | Non-addition | — | 14.6 |

What is claimed is:

1. A polycarbonate composition comprising 100 parts by weight of polycarbonate and 0.1 to 1.0 part by weight of at least one anti-yellowing compound selected from the group consisting of itaconic acid, itaconic anhydride, benzaldehyde dimethyl acetal 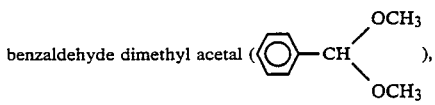, benzaldehyde propyleneglycol acetal

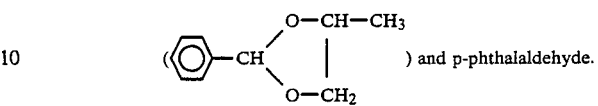 and p-phthalaldehyde.

2. The polycarbonate composition of claim 1 comprising 100 parts by weight of polycarbonate and 0.3 to 0.7 part by weight of at least one kind of said compounds.

3. The polycarbonate composition of claim 1 or 2 which is in the form of pellets.

4. The polycarbonate composition of claim 1 or 2 wherein the anti-yellowing compound is itaconic acid.

5. The polycarbonate composition of claim 1 or 2 wherein the anti-yellowing compound is itaconic anhydride.

6. The polycarbonate composition of claim 1 or 2 wherein the anti-yellowing compound is benzaldehyde dimethyl acetal.

7. The polycarbonate composition of claim 1 or 2 wherein the anti-yellowing compound is benzaldehyde propyleneglycol acetal.

8. The polycarbonate composition of claim 1 or wherein the anti-yellowing compound is p-phthalaldehyde.

9. A molded article formed from the polycarbonate pellets of claim 3.

10. The molded article of claim 9 which has been irradiated with a sterilizing effective amount of gamma rays.

* * * * *

UNITED STATES PATENT AND TRADEMARK OFFICE
CERTIFICATE OF CORRECTION

PATENT NO. : 4,965,303

DATED : October 23, 1990

INVENTOR(S) : Kazuo Kishimoto

It is certified that error appears in the above-identified patent and that said Letters Patent is hereby corrected as shown below:

Column 4, Claim 8, line 30, change "claim 1 or" to

--claim 1 or 2--.

Signed and Sealed this

Twenty-first Day of July, 1992

Attest:

DOUGLAS B. COMER

*Attesting Officer*    *Acting Commissioner of Patents and Trademarks*